Jan. 11, 1966 D. P. FAULK ETAL 3,229,128
ACCELEROMETER AND METHOD OF MANUFACTURE
Filed Oct. 16, 1962 4 Sheets-Sheet 1
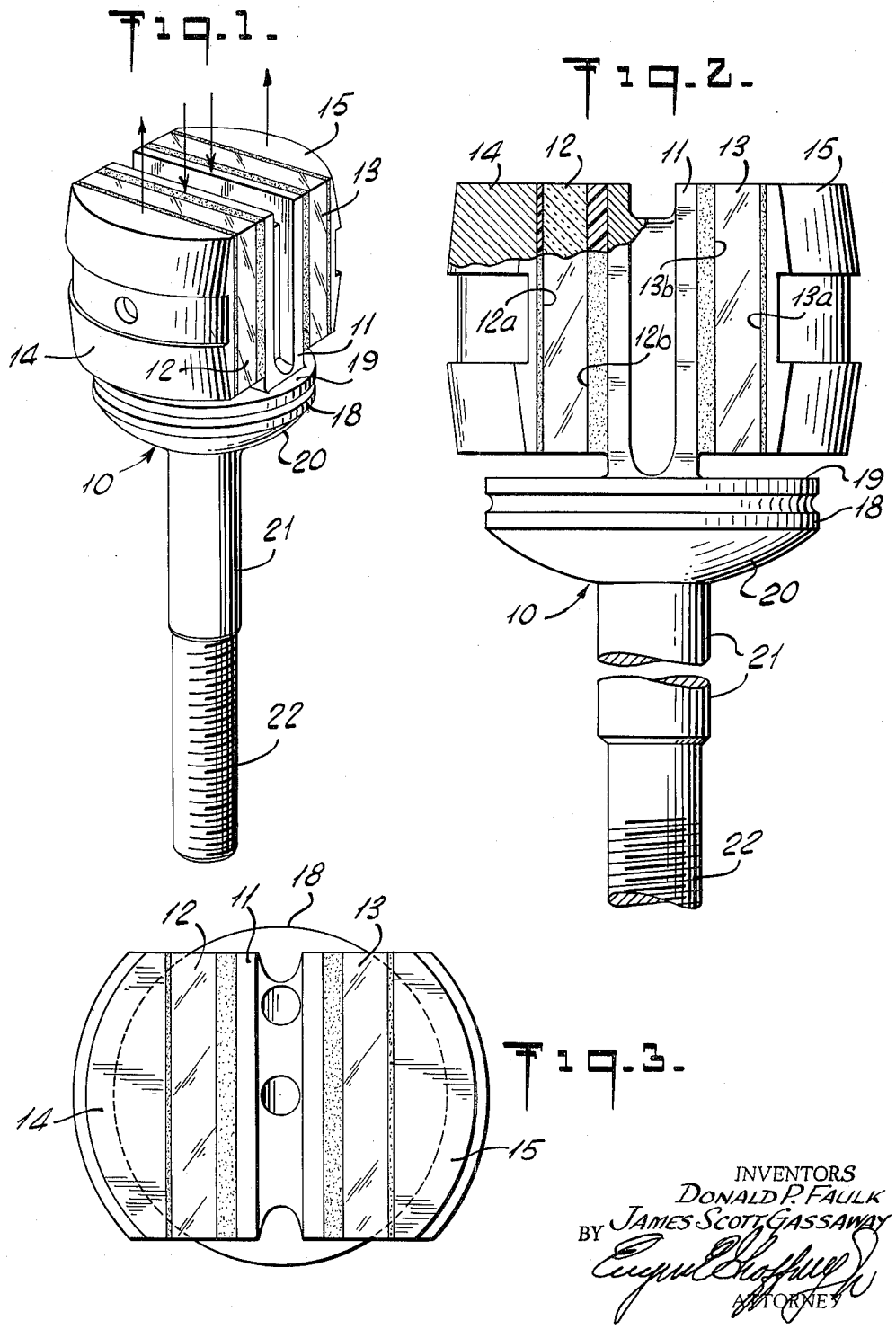
INVENTORS
DONALD P. FAULK
JAMES SCOTT GASSAWAY
BY
ATTORNEY Jan. 11, 1966     D. P. FAULK ETAL     3,229,128
ACCELEROMETER AND METHOD OF MANUFACTURE
Filed Oct. 16, 1962     4 Sheets-Sheet 2
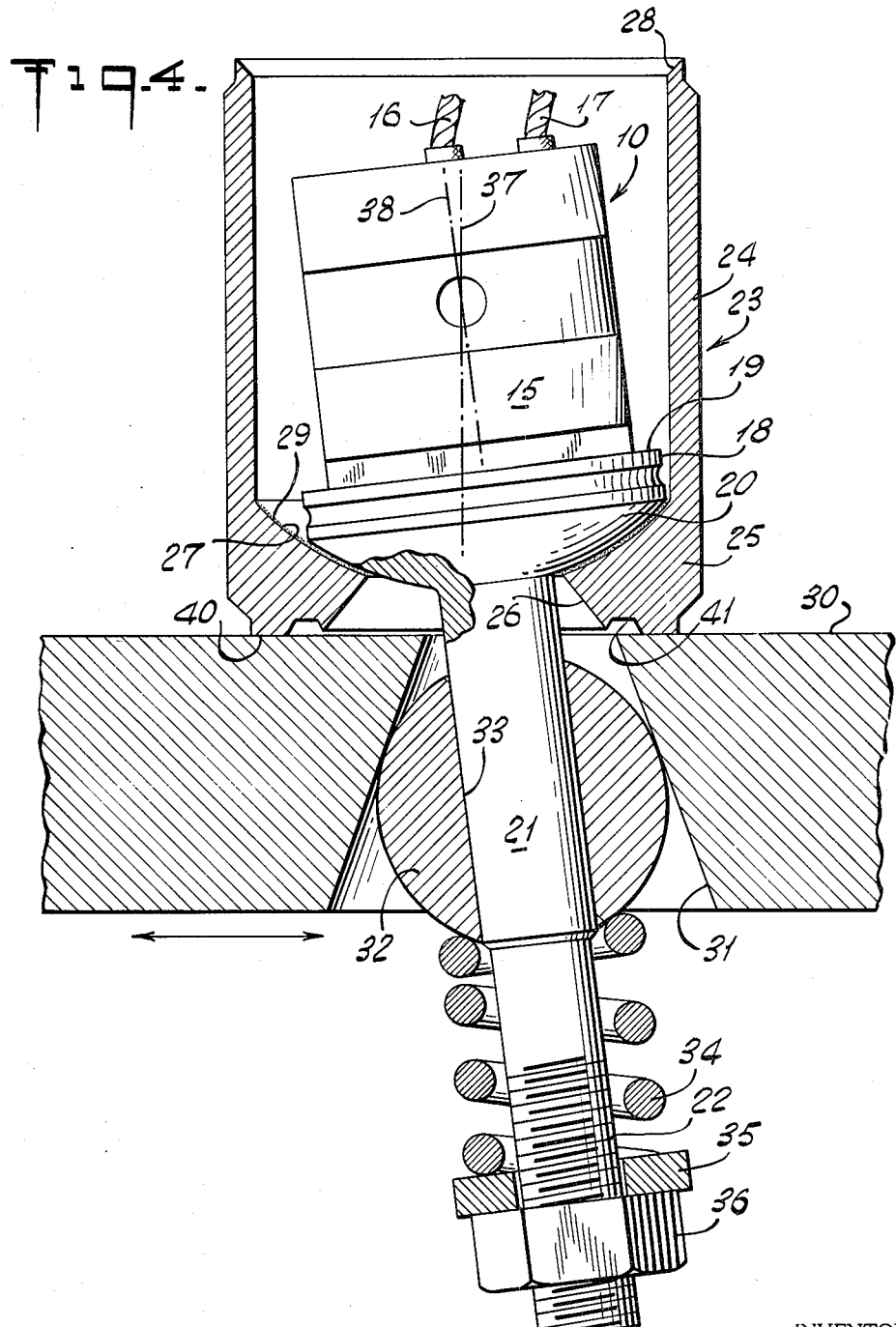
INVENTORS
DONALD P. FAULK
JAMES SCOTT GASSAWAY
BY
ATTORNEY

INVENTORS
DONALD P. FAULK
JAMES SCOTT GASSAWAY
BY
ATTORNEY

Jan. 11, 1966   D. P. FAULK ETAL   3,229,128
ACCELEROMETER AND METHOD OF MANUFACTURE
Filed Oct. 16, 1962   4 Sheets-Sheet 4
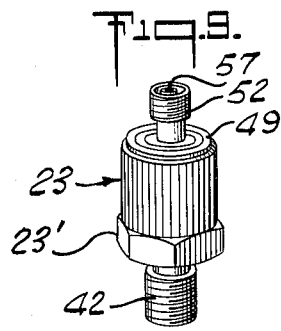
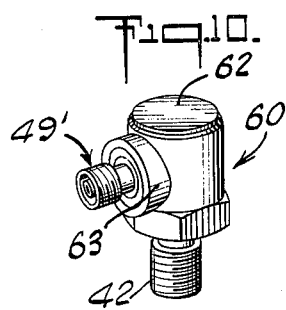
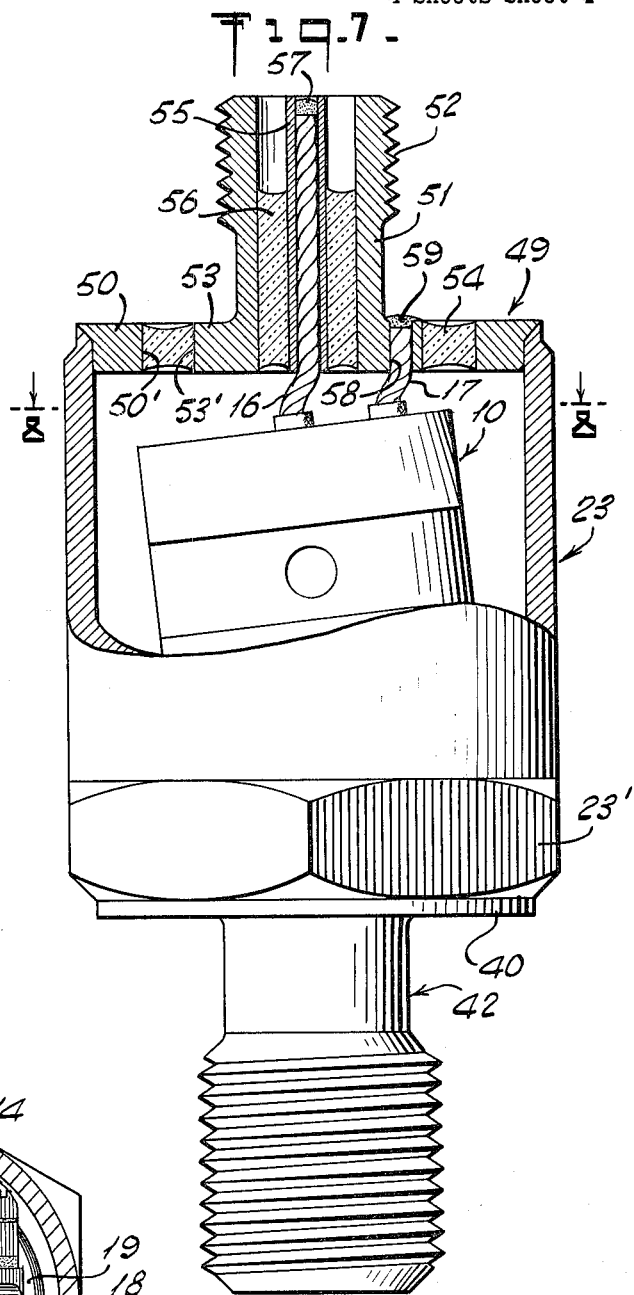
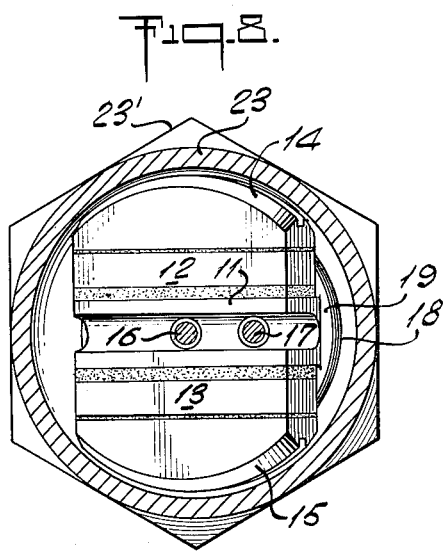
INVENTORS
DONALD P. FAULK
JAMES SCOTT GASSAWAY
BY
ATTORNEY

United States Patent Office 3,229,128

Patented Jan. 11, 1966

3,229,128
ACCELEROMETER AND METHOD OF MANUFACTURE

Donald P. Faulk, Fullerton, and James S. Gassaway, West Los Angeles, Calif., assignors to Electra Scientific Corporation, Fullerton, Calif., a corporation of California Filed Oct. 16, 1962, Ser. No. 230,962

15 Claims. (Cl. 310—8.4)

This invention relates to accelerometers and more specifically concerns a novel and improved accelerometer and method of manufacture.

The manufacture of accelerometers has presented numerous difficulties since the device must be highly sensitive to changes in acceleration along a selected axis and at the same time have a minimum response to acceleration in a plane normal to the selected axis. While the major element or transducer forming part of an accelerometer may take any desired form, in most instances the transducer utilizes a mass together with means for measuring displacement of that mass as a result of acceleration.

One form of transducer that has been found effective for the measurement of acceleration includes a central supporting member having crystals cemented to opposing faces and relatively heavy masses cemented to the outer faces of the crystals. When the transducer is accelerated, the masses tend to resist displacement, and such resistance stresses the crystals and produces a voltage proportional to acceleration.

Notwithstanding the nature of the particular transducer that may be employed, it has been found that manufacturing tolerances are sufficient to produce materal inaccuracies in a resultant transducer notwithstanding the care and precision utilized in mounting the transducing element within a supporting housing. As a result, it has been the practice to manufacture material quantities of accelerometers with the axis of the transducer accurately aligned with the housing, and then by actual tests of the completed units, sort them in accordance with their measured accuracies. These manufacturing techniques have indicated that only a few percent of the total number of transducers manufactured will have a cross axis response of the order of ½ to 1% of the response in the desired axis of motion.

United States Patent Application Serial No. 194,937, filed May 15, 1962, entitled Accelerometer discloses an improved accelerometer wherein the transducer is mounted within the supporting housing in a manner that will enable the manufacture of precision transducers on a production basis wherein the cross axis response can be maintained as low as ½ to 1% of the response in the desired axis of motion.

This invention constitutes an improvement of the above mentioned application for patent and provides a novel and improved accelerometer and method of manufacturing that greatly facilitates the alignment of the transducer within the housing. With this procedure, it is possible to determine the accuracy of a completed unit during the course of manufacture and reject defective transducers before completing the unit, thereby effecting material saving in manufacturing costs and insuring uniformly high quality and precision of all completed units.

Another object of the invention resides in the provision of a novel and improved method for manufacturing accelerometers that greatly facilitates precise positioning of the accelerometer transducer within a protective housing.

Still another object of the invention resides in the provision of a novel and improved accelerometer.

The above and other objects and advantages of this invention will become more apparent from the following description and accompanying drawings forming part of this application.

In the drawings:

FIGURE 1 is a perspective view of a transducer and mount assembly in accordance with the invention and preparator to installation in a housing.

FIGURE 2 is an enlarged side elevational view of the structure shown in FIGURE 1.

FIGURE 3 is a plan view of the structure shown in FIGURE 2.

FIGURE 4 is a side elevational view of the structure shown in FIGURE 1 mounted within a housing in accordance with the invention and illustrating one step in the procedure for adjustably postioning the transducer relative to the housing.

FIGURE 7 is a side elevational view of the complete accelerometer in accordance with the invention and with portions broken away to show the construction thereof.

FIGURE 8 is a cross-sectional view of FIGURE 7 taken along the line 8—8 thereof.

FIGURE 9 is a perspective view of a complete accelerometer at approximately twice normal size.

FIGURE 10 is a perspective view of an accelerometer similar to that shown in FIGURE 9 but utilizing a modified housing.

Figure 5:
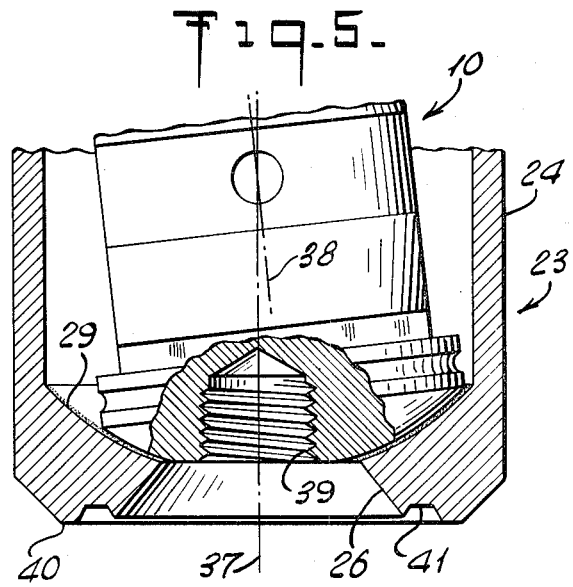
FIGURES 5 and 6 are side elevational views in partial section showing successive steps in securing the transducer within the housing.

As pointed out in the aforementioned application, for United States Patent, of which this invention constitutes an improvement, certain of the difficulties heretofore encountered in the manufacture of accelerometers stem from the characteristics of the crystals and the manufacturing techniques. All crystals including polarized polycrystalline ceramics, have electromechanically sensitive directions of excitation. In the case of natural materials or single crystal materials, the desired mode of operation is selected by cutting in proper relaton to the natural axis of piezoelectric orientation. In the case of polycrystalline ceramics, the desired mode of operation may be achieved by polarizing and electroding in selected directions. In the example shown in FIG. 1, the shear mode is used. The elements respond, therefore, to shear stresses as shown in FIG. 1. The electrical output is a maximum when the mechanical force is applied parallel to the sensitive axis and decreases sinusoidally to zero as the direction of force application is rotated until it is normal to the sensitive axis.

In the use of crystals for seismic transducers to measure acceleration, it is evident that the transducer will generate a voltage under conditions wherein the stress is applied at an angle other than 90° to the stress or electromechanical axis. Under ideal conditions, stresses applied at precisely 90° to the electromechanical axis will produce a negligible signal. Thus, known manufacturing techniques have emphasized the importance of maintaining extremely close tolerances of the crystals and the mounts in order to attain precise alignment of the electromechanical axis of the crystal with the axis of symmetry of the transducer. Furthermore, balanced crystal arrangements utilizing multiple crystals have afforded substantial improvement, since the utilization of two crystals balanced one against the other cancelled some of the inaccuracies and provided improved mechanical and electrical symmetry. Nevertheless, the need for extremely close manufacturing tolerances greatly affected the cost of the completed structure and even accuracies of the order of 1% could not be obtained except by selection from a large number of units.

This invention provides not only an improved manufacturing procedure for the adjustment of the transducing element within the surrounding housing, but also means for securing the transducer permanently in position and at the same time preventing displacement of the transducer relative to the housing once it has been secured therein.

The transducer and its mounting means or base in accordance with the invention is generally denoted by the numeral 10. The taransducer includes a rectangular central support 11 of substantial thickness, and a pair of crystals 12 and 13 cemented to opposite faces of the central support 11. Relatively heavy masses 14 and 15 are cemented to the outer faces of the crystals 12 and 13 respectively. The crystals 12 and 13 may be formed of any suitable material that will generate a voltage as measured between the opposing faces thereof when subjected to shearing stresses.

One form of crystal that provides excellent results comprises a polarized ceramic element having metallic coatings on opposing faces thereof. With reference to the ceramic crystal 12, the metallic coatings are applied to the faces 12a and 12b, while on crystal 13 the metallic coatings are applied to surfaces 13a and 13b. While these metallic coatings may be connected in any suitable manner to produce an output voltage, the coatings 12a and 13a are preferably connected together and coatings 12b and 13b are preferably connected together. These connections form the output terminals of the device and are connected to the leads 16 and 17 as shown more clearly in FIG. 7. For purposes of clarity, the actual connections have been omitted from the drawing.

The central support 11 is either secured to or formed integrally with a circular base 18 having a flat top surface 19 and a hemispherical bottom surface 20. A shaft 21 having a threaded portion 22 extends downwardly from the center of the base 18 and is preferably formed integrally with the base 18.

As described in the above mentioned application for United States Patent, it was found that if the transducer is properly aligned within the surrounding housing or case, the response of the transducer to cross axis motion can be maintained at a minimum value and compensate for manufacturing tolerances normally encountered in the fabrication of the transducers themselves.

Figure 6:
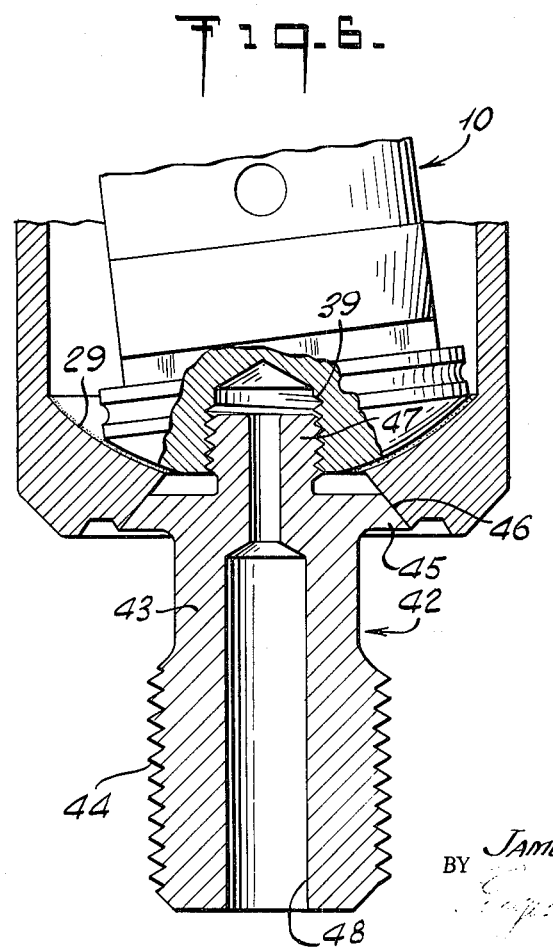

In accordance with this invention, a novel and improved method and structure is employed to hold the transducer within the housing during assembly and testing of the unit and then permanently secure the transducer within the housing after it has been precisely aligned. The steps in the fabrication of an eccelerometer in accordance with the invention are shown in FIGS. 4, 5 and 6.

The housing illustrated in the embodiment of the invention is generally denoted by the numeral 23 and includes an essentially cylindrical wall 24 and an end portion or wall 25. The end wall includes a central opening 26, and the internal surface 27 is preferably provided with a spherical curvature corresponding to the curvature 20 of the base 18. The top of the housing 23 is provided with a tapered edge 28 to receive a top terminal as will be described.

Preparatory to the mounting of the subassembly 10 within the housing 23, the surface 27 of the housing is coated with a cement 29 such as epoxy resin or the like, and the subassembly 10 is placed in position with the shaft 21 extending through the opening 26 in the housing 23. The unit is then placed on a vibrating table 30 having a tapered opening 31 therein. A spherical ball 32 having a central opening 33 is placed over the shaft 21 and moved into engagement with the sides of the conical opening. A helical spring 34 is then placed on the shaft 21, and this assembly is held in place by a washer 35 and a nut 36, the latter engaging the threaded section 22 of the shaft 21. The nut 36 is tightened until sufficient stress is placed on the shaft to hold the subassembly 10 and the housing 23 in a fixed position on the table 30. The leads 16 and 17 from the transducer are then connected to suitable recording means, and the table 30 is then vibrated first in one horizontal direction and then in a second horizontal direction at right angles to the first horizontal direction. During vibration in each horizontal direction, the angular position of the transducer 10 within the housing 23 is adjusted until a minimum signal is obtained on leads 16 and 17. When these cross axis motions have minimum influence on the signal produced on the leads 16 and 17, the transducer is properly adjusted within the housing, and the unit is now ready to be completed. It has been found that in actual practice, the cross axis influence on the accelerometer can be readily adjusted to within ½ to 1% of equivalent motion along the axis of the housing 23. The central axis of the housing is known as the principal axis of the accelerometer and is denoted herein by the numeral 37, while the axis of the transducer itself is denoted by the numeral 38. The magnitude of the angle between the axes 37 and 38 will vary with each transducer as well as the angular position of the plane defined by the two axes.

After the transducer has been positioned as shown in FIG. 4, the housing may be heated to accelerate setting of the epoxy resin or if desired, the unit may remain in position for a period of twenty-four to thirty-six hours to permit the resin to set at room temperature. As soon as the resin has hardened, the transducer 10, together with the housing 23, is removed from the vibrating table 30 by disengagement of the nut 36 and removal of the washer 35, spring 34 and ball 32. The shaft 21 is then cut off as close to the base 18 as possible and the remaining portion of the shaft may then be removed by an endmill and other suitable means. The base 20 is then drilled and tapped as shown in FIG. 5. In order to facilitate alignment of the drilled and tapped hole which is denoted by the numeral 39 in FIG. 5, the housing 23 is provided with an annular bottom surface 40 defining a plane that is precisely at right angles to the central axis 37 of the housing. Since the surface 40 and the adjoining annular groove 41 are concentric with the axis 37, one or both of these surfaces may be used to guide drilling and tapping apparatus in the formation of the threaded hole 39.

After the hole has been completed, a preformed stud 42 having a narrow shank 43 including a threaded portion 44, an annular flange 45 having an outer tapered edge 46 and a threaded section 47 is inserted into the opening 26 in the housing and with the threaded portion 47 engaging the threaded opening 39. If desired, the stud 42 may be reduced in weight by providing a central opening 48 extending therethrough. In normal practice, it is preferable to use a suitable resin or cement on the threaded stud 47 and the inclined surface 46 so that when the stud is tightened in place, it will, in effect, form an integral part of the completed accelerometer. Since the surface 46 has the same inclination as the opening 26 in the housing, these surfaces will contact to close the opening 26 and at the same time cooperate with the stud 47 to securely hold the transducer in the adjusted position within the housing.

The assembly of the accelerometer thus far described is completed by attachment of a top terminal assembly generally denoted by the numeral 49 in FIG. 7. This terminal comprises an annular ring 50 which engages the top edge of the housing wall 24 and is held in place by cement or other suitable fastening means. The center portion of the terminal 49 comprises a hollow stud 51 having a threaded portion 52 and an annular flange 53. The flange 53 is secured in coaxial alignment with the ring 50 by the utilization of a suitable insulating material 54 that will adhere to the edges 50' and 53' of elements 50 and 53 respectively to form a substantially unitary structure. The hollow stud 51 includes a central metallic sleeve 55 secured in place by an insulating material 56 filling the space between the sleeve 54 and the inner wall of the hollow stud 51 to a point spaced from the top surface of the stud 51. The lead 16 is inserted through the sleeve 55 and is electrically connected thereto by the utilization of solder 57. The lead 17 is inserted through an opening 58 in the annular flange 53 and soldered to the flange at 59.

The foregoing arrangement provides a hermetically sealed unit with the electrical connections being made by the attachment of a suitable male connector to the female connector 49. When the transducer is mounted in position to measure acceleration of a vehicle, the accelerometer mount should preferably include a flat surface normal to the direction of motion, and a threaded opening to receive the threaded mounting stud 42. It has been found that even if the opening to receive the stud 42 is not precisely perpendicular to the mounting surface, the annular face 40 on the bottom of the accelerometer will serve to precisely align the accelerometer with the mounting surface. For convenience in mounting the accelerometer, the bottom portion of the housing 23 is provided with a hexagonal configuration 23' to accommodate a suitable wrench. The finished accelerometer as described above is shown in FIG. 9 and it is substantially twice the normal size of actual units fabricated by this method. It is understood, of course, that the same procedure may be utilized with units of any size and configuration. It is further understood that transducers other than the specific transducer described herein may also be mounted in accordance with this invention.

FIG. 10 shows a transducer 60 substantially identical to the transducer 24 except that the top of the housing 61 is closed by a flat cover or plate 62, and the side of the housing includes an opening 63 for accommodation of a terminal assembly 49' substantially identical to the terminal assembly 49 illustrated in FIG. 7.

While only one embodiment of the invention has been illustrated and described, it is evident that modifications, alterations and changes may be made without departing from the true scope and spirit thereof as defined in the appended claims.

What is claimed is:

1. In the manufacture of an accelerometer, the method of mounting a transducer carried by a base in a selected position within a housing having a closed end portion with an opening extending therethrough, wherein said housing has a principal mechanical axis and a mounting surface on the outer side of said closed end portion which is normal to said axis, and said transducer has an electromechanical axis, comprising the steps of adjustably securing said transducer in said housing, subjecting the transducer and housing to velocity changes in the plane of said mounting surface while measuring signals produced by said transducer as a result of said velocity changes, adjusting said transducer relative to said mount to minimize the signals produced by said velocity changes, then with the transducer held in the adjusted position forming a hole in said base with the axis of said hole normal to said mounting surface and substantially coincident with the axis of said opening and then fixing a mounting stud in said hole and in engagement with said housing to hold said transducer in said adjusted position.

2. In the manufacture of an accelerometer, the method of installing an acceleration sensitive transducer on a carrier member comprising the steps of mounting said transducer on a base having a curved surface with a shaft extending from said surface, forming a curved surface on said carrier member with an opening extending therethrough, the last said surface having a contour for cooperatively receiving the first said curved surface with said shaft extending through said opening, positioning said transducer on said carrier and in a selected angular relationship to said carrier member by means of said shaft, holding said transducer in said selected angular relationship independently of said shaft, removing said shaft, and then mechanically securing said base to said carrier member.

3. In the manufacture of an accelerometer, the method according to claim 2 including the step of forming a plane surface on said carrier member, and wherein said transducer is positioned relative to said plane surface.

4. In the manufacture of an accelerometer, the method of installing an acceleration sensitive transducer on a carrier member comprising the steps of mounting said transducer on one side of a base, forming a curved surface on the other side of said base, said base including a shaft extending from said curved surface, forming a curved surface on one side of said carrier member, an accelerometer aligning surface on the other side thereof and an opening extending therethrough, placing a cement on at least one curved surface and then placing said curved surfaces in overlying relationship with said shaft extending through said opening, adjusting said transducer relative to said aligning surface while stressing said shaft to hold said curved surfaces in tight engagement, setting said cement to hold the carrier and base one to the other, severing said shaft from said base, drilling a hole in said base having its axis substantially coincident with the axis of the first said opening and then securing a mounting stud in said hole.

5. In the manufacture of an accelerometer according to claim 4 wherein said stud is formed with carrier member engaging means and said engaging means is placed in pressure relationship to said carrier member.

6. In the manufacture of an accelerometer according to claim 4 including the steps of forming the first said opening with a tapered periphery, forming said hole with screw threads, forming said stud with threaded end portions and an intervening annular flange with a tapered perimeter and engaging one threaded end of said stud with said threaded hole and with said tapered surfaces in pressure engagement one with the other.

7. In the manufacturer of an accelerometer according to claim 6 wherein said carrier member comprises a transducer enclosing housing.

8. An accelerometer comprising a housing, a closed end on said housing, an acceleration detecting transducer including a base within said housing, cooperating means on said base and inner surface of said closed end for holding said transducer in predetermined alignment with said housing, and mechanical means extending through said housing and secured to said base to hold said transducer in said predetermined alignment.

9. An accelerometer comprising a housing, a closed end on said housing, an acceleration detecting transducer including a base within said housing, cooperating means on said base and inner surface of said closed end for holding said transducer in predetermined alignment with said housing, and mechanical means extending through said housing and secured to said base to hold said transducer in said predetermined alignment, said mechanical means comprising a threaded stud having housing and base engaging means to hold said cooperating surfaces in pressure engagement one with the other.

10. An accelerometer comprising a housing having a peripheral wall, means closing one end of said housing having an inner curved surface and a central opening therethrough axially aligned with said housing, a transducer base having a curved surface for cooperation with the first curved surface, a transducer within said housing and carried by said base, and a stud extending through said opening and engaging said base to secure said base to said housing, said stud being axially aligned with said housing.

11. An accelerometer according to claim 10 wherein said opening is tapered outwardly, said base includes a threaded hole and said stud includes a threaded end portion engaging said threaded hole and a tapered portion in pressure engagement with said tapered opening.

12. An accelerometer according to claim 11 wherein said curved surfaces are cemented one to the other.

13. An accelerometer according to claim 10 wherein said housing includes a flat surface surrounding said opening and defining a plane normal to the axis of said housing and said stud is normal to said plane.

14. An accelerometer comprising a housing having a peripheral wall, means closing one end of said housing, said closing means having an inner concave surface, a tapered opening extending therethrough and an outer surface, said outer surface defining a plane normal to the axis of said housing, a transducer assembly including a balanced, inertia type, ceramic crystal transducer carried by a base, said base having an outer convex curvature corresponding in configuration with the first said curved surface, said transducer assembly being disposed within said housing with said curved surfaces cemented one to the other and with said transducer adjusted relative to said housing axis whereby said transducer produces a minimum signal as a result of cross-axis vibration, and a mounting stud threaded end portions and a tapered center portion, said base including a threaded opening coaxially aligned with said housing and one threaded end portion of said stud threadably engages said base with the tapered portion in a pressure engagement with the tapered opening in said housing to mechanically secure said transducer assembly in the adjusted position.

15. An accelerometer according to claim 14 wherein the other end of said housing is hermeitcally sealed and said accelerometer carries sealed terminals connected to said transducer.

References Cited by the Examiner
UNITED STATES PATENTS

| | | | |
|---|---|---|---|
| 2,727,296 | 12/1955 | Craiglow | 29—25.35 |
| 2,763,050 | 9/1956 | Ciccolella | 29—25.35 |
| 3,120,622 | 3/1960 | Dranetz et al. | 310—8.4 |
| 3,093,759 | 6/1963 | Orlacchia | 310—8.4 |
| 3,104,335 | 9/1963 | Shoor | 310—8.4 |

ORIS L. RADER, *Primary Examiner.*

MILTON O. HIRSHFIELD, *Examiner.*